United States Patent
Thiers

(10) Patent No.: US 10,601,972 B2
(45) Date of Patent: Mar. 24, 2020

(54) ROTATABLE ELECTRICAL CONNECTOR

(71) Applicant: Jean-Michel Andre Thiers, Sunnyvale, CA (US)

(72) Inventor: Jean-Michel Andre Thiers, Sunnyvale, CA (US)

( * ) Notice: Subject to any disclaimer, the term of this patent is extended or adjusted under 35 U.S.C. 154(b) by 0 days.

(21) Appl. No.: 16/153,909

(22) Filed: Oct. 8, 2018

(65) Prior Publication Data

US 2019/0052739 A1 Feb. 14, 2019

Related U.S. Application Data

(63) Continuation of application No. 15/839,753, filed on Dec. 12, 2017, now Pat. No. 10,104,211, which is a continuation of application No. 14/839,861, filed on Aug. 28, 2015, now Pat. No. 9,848,071.

(51) Int. Cl.
| | |
|---|---|
| *H04M 1/04* | (2006.01) |
| *H01R 31/06* | (2006.01) |
| *H04M 1/02* | (2006.01) |
| *H01R 13/62* | (2006.01) |
| *H01R 13/24* | (2006.01) |

(52) U.S. Cl.
CPC .............. *H04M 1/04* (2013.01); *H01R 31/06* (2013.01); *H04M 1/0274* (2013.01); *H01R 13/24* (2013.01); *H01R 13/6205* (2013.01)

(58) Field of Classification Search
CPC .... H01R 13/6205; H01R 31/06; H01R 13/24; H04M 1/04
See application file for complete search history.

(56) References Cited

U.S. PATENT DOCUMENTS

| | | | |
|---|---|---|---|
| 3,786,391 A | 1/1974 | Mathauser | |
| 3,808,577 A | 4/1974 | Mathauser | |
| 5,708,874 A | 1/1998 | Schrock | |
| 7,582,828 B2 | 9/2009 | Ryan | |
| 7,683,572 B2 | 3/2010 | Toya | |
| 7,726,994 B1 * | 6/2010 | Willey | A42B 3/042 439/218 |
| 9,019,698 B2 | 4/2015 | Thiers | |
| 9,337,582 B2 | 5/2016 | Sato et al. | |
| 9,678,537 B2 | 6/2017 | Kupferstein | |
| 10,104,211 B2 * | 10/2018 | Thiers | H01R 31/06 |
| 2006/0046579 A1 | 3/2006 | Karadimas et al. | |
| 2006/0086873 A1 | 4/2006 | Chen | |

(Continued)

*Primary Examiner* — Briggitte R. Hammond

(57) ABSTRACT

A connecting system for an electronic device is disclosed herein. The connecting system may comprise a connector port including an alignment feature and two or more conductive traces corresponding to contacts of a dock interface. The connector port may be rotatable relative to the dock interface with at least two conductive traces arranged in a manner such that the contacts are maintained in contacting relation with the conductive traces along a contact path when the electronic device is rotated relative to the dock interface. The connector port may further include one or more nonconductive separating spaces that separate the at least two conductive traces along the contact path. The connecting system may comprise a rotation stop arranged such that the contacts are prevented from having contacting relation with conductive traces other than a conductive trace to which the contact corresponds and with which the contact is aligned.

20 Claims, 12 Drawing Sheets

(56) References Cited

U.S. PATENT DOCUMENTS

| | | |
|---|---|---|
| 2014/0066138 A1 | 3/2014 | Kim et al. |
| 2014/0263929 A1 | 9/2014 | Grziwok et al. |
| 2014/0321048 A1 | 10/2014 | Kupferstein |
| 2014/0322930 A1 | 10/2014 | Sizelove et al. |
| 2015/0072555 A1 | 3/2015 | Riddiford et al. |

* cited by examiner

ROTATABLE ELECTRICAL CONNECTOR

CROSS-REFERENCE TO RELATED APPLICATIONS

This application claims the benefit of and is a continuation of U.S. Non-Provisional patent application Ser. No. 15/839,753; filed Dec. 12, 2017; and entitled ROTATABLE ELECTRICAL CONNECTOR. The entire contents of U.S. patent application Ser. No. 15/839,753 are incorporated by reference herein.

U.S. Non-Provisional patent application Ser. No. 15/839,753 claims the benefit of and is a continuation of U.S. Non-Provisional patent application Ser. No. 14/839,861; filed Aug. 28, 2015; and entitled ROTATABLE ELECTRICAL CONNECTOR. The entire contents of U.S. patent application Ser. No. 14/839,861 are incorporated by reference herein.

FIELD OF THE DISCLOSURE

The present disclosure relates generally to electronic devices and, more particularly, to a connecting system for an electronic device such as a smart phone.

BACKGROUND

An increasing number of portable electronic devices have been developed in recent years. Such portable electronic devices include smart phones, tablets, media players, navigation systems, and a variety of other portable electronic devices. Such electronic devices typically include one or more connecting ports for linking the electronic device to data and power via an external cable. In order to minimize their size, weight, and cost, such portable electronic devices typically have a relatively small battery with limited battery capacity. The limited battery capacity of such portable electronic devices forces users to recharge the battery using the external cable. The physical connection between the electronic device and the external cable requires careful attention by the user to align the external cable with the exact location of the connector port on the electronic device. In addition, the user must carefully orient the connector for successful engagement to the connector port on the electronic device.

Many users frequently operate their portable electronic devices in a variety of different environments. For example, many users use their smart phones at home, at the office, and while travelling in an automobile or on public transportation. Whether at home, at work, or in a vehicle, it is often advantageous to support an electronic device in a clearly visible position while the user performs other activities. In addition, it is advantageous to support the electronic device in a secure manner. Of the multitude of mounts available on the market, mounts that securely support the electronic device unfortunately require a two-handed operation to insert the electronic device in position on the mount. For mounts that allow for battery charging, the connection to the electronic device is often performed via a connecting port which requires two-handed operation for careful alignment of the connecting port with an external cable. The external cable and bulky mount also adds visual and physical clutter to the area where the electronic device is used.

Many device manufacturers have standardized the connecting ports to be similar across at least each manufacturer's series of smart devices, if not across the whole industry. The standardization of the connecting ports is convenient for the consumer because it allow for the connection and charging of different devices using a single cable configuration. Unfortunately, this convenience is lost when a user needs to mount their device for battery charging or for hands-free operation due to the fact that most charging mounts are either specific to a device, or the mount requires two-handed adjustment of the mount so that the mount will accept the device.

Now that smart devices play such an important role in many people's lives, it becomes a great nuisance when such smart devices fail to perform due to lack of battery power. In this regard, it has become increasingly desirable for device and accessory manufacturers to provide a viable solution to the limited battery power for portable electronic devices. One attempt at solving the problem includes wireless charging technology. Wireless technology is now available as an accessory for many smart devices in the way of a specialized case, and as a built-in option. Although certain wireless charging arrangements offer a means for charging an electronic device, such wireless charging arrangements also have a number of inherent drawbacks. One such drawback is the fact that the wireless charging of a battery creates heat which reduces the life of the battery. In addition, current wireless charging technology is slower than conventional charging methods. Furthermore, wireless charging technology lacks a means for sending data to the electronic device during the charging operation. In addition, current wireless charging technology is not understood to allow for rotation of an electronic device from portrait mode (e.g., vertical orientation) to landscape mode (e.g. horizontal orientation) while maintaining the power and data transfer capability.

The consumer electronic industry is moving toward fewer connector ports on devices by combining the functions of what previously took multiple connectors into one. This result in connectors with an ever growing array of conductors to carry various high speed data lines such as USB 3 and HDMI as well as power. While simpler connectors such as headphone jacks allow rotation while being connected there isn't a compact connector available that combine easy connection and the ability to rotate while staying connected in a compact yet conductor dense design.

In light of the above-noted limitations, the prior art includes several attempts to overcome deficiencies associated with the connecting and mounting of electronic devices and, more particularly, the connecting of smart devices such as smart phone and tablets. For example, U.S. Pat. No. 7,582,828, issued to Ryan, discloses a system and method for mounting an electrical device on a wall. The electrical device has a mount and a base. The base connects to an electrical outlet on a surface, and has a first electrical connector, and a magnetic face plate. The electrical device has a magnet and a second electrical conductor that are positioned so that the magnet mates with the magnetic face plate, and the second electrical connector mates with the first electrical connector.

U.S. Pat. No. 6,565,363, issued to Downing, discloses a modular jack system that utilizes magnetic attraction to draw a plug into a jack and then maintain it therein. The modular jack system utilizes plug and jack having at least one pair of cooperating magnets polarized so that the magnets on the plug are drawn to the magnets on the jack thereby pulling the plug into the proper connected position and maintaining it therein. The system is shown to be adaptable for use with other applications such as coaxial cable connections to replace the threaded and slip-on types.

U.S. Pat. No. 3,786,391, issued to Mathauser, discloses a magnetic self-aligning electrical connector comprising a pair of connector or coupling halves each having electrical contact means therein and one of said coupling halves having magnetic means therein disposed opposite means in said other coupling half for cooperation with said magnet means to hold said coupling halves together with the electrical contact means in electrically conducting contacting relationship with one another, said electrical contact means in one of said coupling halves mounted for movement relative to the coupling half to insure alignment between the electrical contact means even though the coupling halves are misaligned.

U.S. Pat. No. 3,808,577, issued to Mathauser, discloses a quick-disconnect, magnetic, self-aligning telephone jack or other communication equipment connection, including a male connector half and a female connector half, each with self-aligning magnetic means therein to hold the male and female halves together and cooperating electrical contact means in the male and female connector halves to establish electrical connection between a telephone or other communication equipment and a source of electrical energy.

U.S. Pat. No. 9,019,698, issued to Thiers, discloses a mounting system for an electronic device that may include a dock interface assembly and a case assembly. The dock interface assembly may include a dock housing having one or more contacts. The case assembly may include an alignment feature and a case printed circuit board having one or more conductive traces corresponding to the contacts. The dock interface assembly and/or the case assembly may have a metallic element configured complementary to one or more magnets provided with a remaining one of the dock interface assembly and the case assembly for magnetic coupling of the case assembly to the dock interface assembly. The dock housing may be configured to be received by the alignment feature such that at least one of the contacts is electrically coupled to a corresponding one of the conductive traces.

Although some of the above-referenced patents disclose a means of connecting electronic devices, none of the references are understood to disclose an arrangement addressing all of the above-mentioned drawbacks associated with the power and data connection of the electronic device. More specifically, none of the above-mentioned references are understood to disclose a conductor dense connection which remains connected during rotation.

As can be seen, there exists a need in the art for a connecting system for an electronic device that allows a conductor dense connection which remains connected during rotation. Furthermore, there exists a need in the art for a connecting system for an electronic device that can accommodate a variety of different types of electronic devices. Additionally, there exists a need in the art for a connecting system for an electronic device that eliminates the clutter associated with loose cables. Also, there exists a need in the art for a connecting system for an electronic device that provides the same speed of charging and data transmission that is available with conventional cables. Finally, there exists a need in the art for a connecting system that allows for simple one-handed movement to securely install and connect the electronic device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
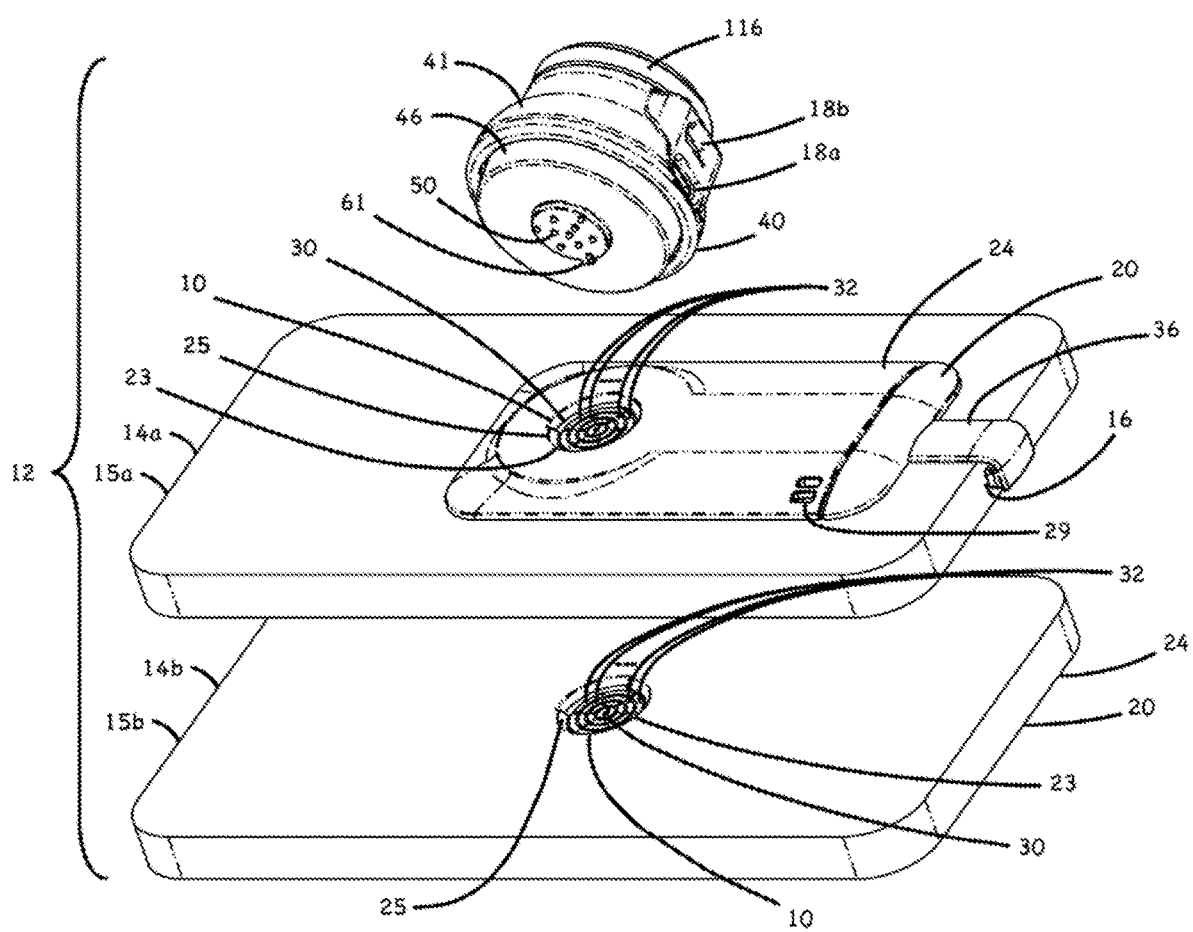
FIG. 1 is an exploded perspective view of a connecting system for two electronic devices such as smart phones and including a dock interface assembly for magnetically coupling with the electronic devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The deficiencies and drawbacks associated with conventional connecting systems for electronic device are specifically addressed and alleviated by a connecting system as disclosed herein and which may incorporate a dock interface assembly. The dock interface assembly may include a dock housing having one or more contacts. The electronic device assembly may include an alignment feature and a connector port having one or more conductive traces corresponding to the contacts. The dock interface assembly and/or the electronic device assembly may have a mechanical coupler that is arranged to latch when properly aligned or a magnetic coupler that is arranged to magnetically couple the dock and electronic device when properly aligned. The dock housing may be configured to be received by the alignment feature such that at least two of the contacts are electrically coupled to corresponding ones of the conductive traces. In addition the electronic device may be arranged to stop rotation past a threshold degree of rotation such that two or more conductive traces are prevented from changing the contacting relation from one contact to a different contact.

Although the connecting system of the present disclosure may be configured for use on any electronic device requiring a removable electrical connection, the connecting system is described in the context of a dock interface assembly equipped with a round-shaped magnet holder which surrounds a set of spring-loaded electrical contacts. The spring-loaded electrical contacts may be assembled in radial arrangement and may include a contact being electrically couplable to a center conductive trace, with successive contacts being aligning with matching conductive traces on the case printed circuit board of the electronic device original case assembly or on a separate protective case surrounding the electronic device. The dock interface assembly may be built into product such as tables and automotive dashboards or be used in conjunction with an adjustable mount that may be mounted on a desk, clamped to a handlebar of a bicycle, or any one of a variety of other embodiments.

In an embodiment, the connecting system may include a dock interface assembly including a dock housing containing one or more magnets and one or more contacts protruding from the dock housing. The connecting system may include a case assembly having an alignment feature, a metallic ring, and a case printed circuit board having one or more conductive traces corresponding to the contacts. The metallic ring may be configured complementary to an arrangement of the magnets for magnetic coupling of the metallic ring to the dock interface assembly. The dock housing may have an outer perimeter configured to be received by the alignment feature such that each one of the contacts engages a corresponding one of the conductive traces. The contacts may be configured to be electrically coupled to the conductive traces of the case printed circuit board. The case assembly may be arranged to stop rotation past a threshold degree of rotation such that two or more conductive traces are prevented from changing the contacting relation from one contact to a different contact.

In a further embodiment, disclosed is a connecting system for a smart phone. The connecting system may include a dock interface assembly including a dock housing containing one or more magnets arranged in a circular array, the dock housing containing one or more contacts protruding from the dock housing. The case assembly may have a cover which may include an alignment feature configured as a circular opening, a metallic ring disposed within the circular opening, and a case printed circuit board circumscribed by the metallic ring and having one or more annular conductive traces corresponding to the contacts. The metallic ring may be configured complementary to an arrangement of the magnets for magnetic coupling of the metallic ring to the dock interface assembly. The dock housing may have a circular outer perimeter configured to be received by the alignment feature such that each one of the contacts engages a corresponding one of the conductive traces. The contacts may be configured to be electrically coupled to the conductive traces of the case printed circuit board. The case printed circuit board may include a connector configured to engage a connector port of the electronic device. The contacts may be coupled to a cable transmitting at least one of power or data to the contacts, into the conductive traces, through the connector and into the electronic device while the electronic device is magnetically coupled to the dock interface assembly and during rotation thereof. The connector port may be equipped with a feature allowing limited rotational range such that two or more conductive traces are prevented from changing the contacting relation from one contact to a different contact. The dock may have a matching rotational stop feature designed to fit within the rotational range feature of the case assembly. The rotational stop feature may be shaped to provide the user with a referent to the rotation limit and may be designed to allow the user to rotate the electronic device past the limit but be designed in such a way as to prevent two or more conductive traces from changing the contacting relation from one contact to a different contact.

In an embodiment, the connecting system includes a connector port that is rotatable relative to the dock interface with at least two conductive traces arranged in a manner such that the contacts are maintained in contacting relation with the conductive traces along a contact path when the electronic device is rotated relative to the dock interface. The connector port may further include one or more non-conductive separating spaces that separate the at least two conductive traces along the contact path.

In an embodiment, the connecting system includes a rotation stop arranged such that the contacts are prevented from having contacting relation with conductive traces other than a conductive trace to which the contact corresponds and with which the contact is aligned. The rotation stop may prevent rotation of the connector port (and the electronic device) past a threshold degree such that the two or more conductive traces are prevented from changing the contacting relation form one contact to a different contact.

The features, functions and advantages that have been discussed can be achieved independently in various embodiments of the present disclosure, or may be combined in yet other embodiments, further details of which can be seen with reference to the following description and drawings below Referring now to the drawings wherein the showings are for purposes of illustrating various embodiments of the present disclosure, shown in FIG. 1 is an exploded perspective view of a connecting system 12 for a first electronic device 14a and a second electronic device 14b and including a dock interface assembly 40 for magnetically coupling with the electronic devices 14. In the embodiment shown, the electronic devices 14a and 14b are configured as smart phones 15a and 15b. However, the connecting system 12 as disclosed herein may be implemented on any one of a variety of different configurations of electronic devices 14, and is not limited to implementation on a smart phone 15. The connecting system 12 may include a dock interface assembly 40 to which the electronic device 14 and/or a case assembly 20 may be magnetically coupled. The dock interface assembly 40 may include a magnet holder 46 and/or one or more magnets 48. The case assembly 20 which may include a metallic element 26 such as a metallic ring. Advantageously, the magnetic attraction between the magnets 48 and the metallic element allows for use of the dock interface assembly 40 in a variety of different environments including environments where there is significant vibration.

In an embodiment, the dock interface assembly 40 may be used on a base 116 backed with double sided foam tape 63 for mounting to a variety of surface, such as a wall. In a further embodiment, the dock interface assembly 40 may be directly mounted on a surface such as an automobile dashboard 120 such as for vehicle use. The dock interface assembly 40 may also be used within the surface of a table 122 such as a conference room table for charging and/or connecting electronic device 14 for screen sharing purpose. However, the dock interface assembly 40 may be incorporated for use in any one of a variety of different environments and applications, and is not limited to the above-described embodiments for wall use, vehicle use, and conference room use. In situations where there is a high risk of the magnetic attraction being broken and the electronic device 14 being knocked off of the dock interface assembly 40, a wrist strap (not shown) may be used on the case assembly 20 via a wrist strap hole 29 that may be included with the case assembly 20 of the electronic device 14. The wrist strap (not shown) may be placed around the base 116 prior to mounting the electronic device 14. If the electronic device 14 is knocked off of the dock interface assembly 40, the electronic device 14 will be retained by the wrist strap (not shown).

The dock interface assembly 40 may include one or more contacts 50. The contacts may protrude from the dock housing 41. In an embodiment, the contacts 50 may be spring-loaded, although the contacts 50 may be provided in a non-spring-loaded arrangement (not shown). The case assembly 20 may include an alignment feature 25, the metallic element 26, and a case printed circuit board (PCB) 30, together forming a connector port 10. As indicated above, one end of the case PCB 30 may have one or more conductive traces 32 which may be arranged to correspond to the contacts 50. An opposite end of the case PCB 30 may include a connector assembly 36 which may be electrically coupled to the conductive traces 32 via internal wires (not shown). The connector assembly 36 may be configured to engage a connector port 16 of the electronic device 14. As indicated above, the conductive traces 32 may be annularly-shaped and may be exposed to an exterior on the electronic device 14 such as on a case housing 24 of the case assembly 20 as shown in FIG. 1. Although the conductive trace 32 are shown as annularly-shaped in FIG. 1 they may be provided in other shapes and sizes, and is not limited to a ring shape.

In FIG. 1, the connector port 10 including an alignment feature 25 and two or more conductive traces 32 corresponding to contacts 50 of a dock interface assembly 40. The conductive traces 32 are shown as being divided by non-conductive separating spaces 58 that separate conductive traces 32 along the contact path 7 of the contacts 50 when the electronic device 14 is rotated about the dock interface assembly 40. The dock interface assembly 40 may include a rotation stop 61 designed to travel within a rotation range 60 that may be built into the case assembly 20. The rotation stop 61 may be arranged such that the contacts 50 are prevented from having contacting relation with conductive traces 32 other than a conductive trace 32 to which the contact 50 corresponds and with which the contact is aligned.

In FIG. 1, the contacts 50 may protrude from the dock housing 41 and may be arranged in such a manner that each one of the contacts 50 is aligned with a conductive trace 32 of the printed circuit board 30 of the case assembly 20. As described in greater detail below, the connecting system 12 may include an alignment feature 25 for aligning the contacts 50 with the conductive traces 32 when the electronic device 14 is magnetically coupled to the dock interface assembly 40. In an embodiment, the dock housing 41 or magnet holder 46 may have a corresponding alignment feature such as an outer perimeter configured to be received by the alignment feature 25 of the case assembly 20 such that each one of the contacts 50 may engage a corresponding conductive trace 32 of the case PCB 30.

In FIG. 1, the alignment feature 25 of connector port 10 may comprise a circular opening 23 or a circular depression that may be formed in the rear cover 24 of the case assembly 20. However, the alignment feature 25 may be provided in other configurations. The dock housing 41 or magnet holder 46 may have a shape configured to engage the alignment feature. For example, the magnet holder or dock housing may have a circular outer shape that may be sized and configured to nest within the circular opening 23 of the rear cover 24. One or more of the conductive traces 32 may have a circular configuration, an annular configuration, or a ring-shaped configuration, although the conductive traces 32 may be provided in other shapes such as in arcuate shapes (not shown) of less than 360 degrees. The conductive traces 32 may be arranged in a manner such that the contacts 50 are maintained in contacting relation with the conductive traces 32 while following the contact path 7 when the electronic device 14 is rotated relative to the dock interface assembly 40. In this manner, the contacts 50 may be substantially continuously electrically coupled to the conductive traces 32 to allow the electronic device to receive continuous power and/or data while the electronic device 14 is rotated about the dock interface assembly 40 within the rotation range 60. In the embodiment shown in FIG. 1 the rotation range 60 is designed to allow ninety degrees of rotation, such as to rotate the electronic device 14 from portrait orientation to landscape orientation, although the rotation range 60 may be provided with a different rotation range. The contacts 50 may be spring-loaded such that the contacts 50 are maintained in continuous contacting relation with the conductive traces 32 during rotation of the electronic device 14 relative to the dock interface assembly 40.

The connector port 10 of the present disclosure represents a significant improvement over prior art connecting systems 12 for electronic devices 14. More specifically, in the present disclosure, the contacts 50 may be arranged as to allow the electronic device 14 to rotate relative to the dock interface assembly 40 while maintaining continuous engagement between the contacts 50 and the conductive traces 32. As indicated above, the dock interface assembly 40 may include the dock housing 41 and/or the magnet holder 46 which may have a generally round or circular shape to engage with a corresponding circular feature. As indicated above, the circular feature may comprise the circular opening 23 or circular depression that may be formed in the rear cover 24 of the case assembly 20. In this regard, the magnet holder 46 may advantageously act as a locator to facilitate the alignment of each contact 50 with its corresponding conductive trace 32. Although FIG. 1 illustrates the contacts 50 in a radially linear arrangement, the contacts 50 may be provided in any arrangement including a non-linear arrangement.

Although the connecting system 12 of the present disclosure may be implemented for use with any type of housing for any type of electronic device 14, one embodiment may have the connecting port 10 mounted inside the case assembly 20 which itself is mounted on the first electronic device 14a. An alternative embodiment the second electronic device 14b may have its connector port 10 directly applied to an outside surface of its outer case as its primary means of data, music, and/or power or charging connection, and thereby eliminating the need for an external case assembly. The conductive traces 32 on the printed circuit board 30 may be directly built into the case housing 24 of the second electronic device 14b, as opposed a separate case assembly 20 covering the first electronic device 14a. As described below, the locating surface 25 may also be built into the second electronic device 14b to allow for proper alignment of the conductive traces 32 with the contacts 50 of the dock interface assembly 40.

Figure 2:
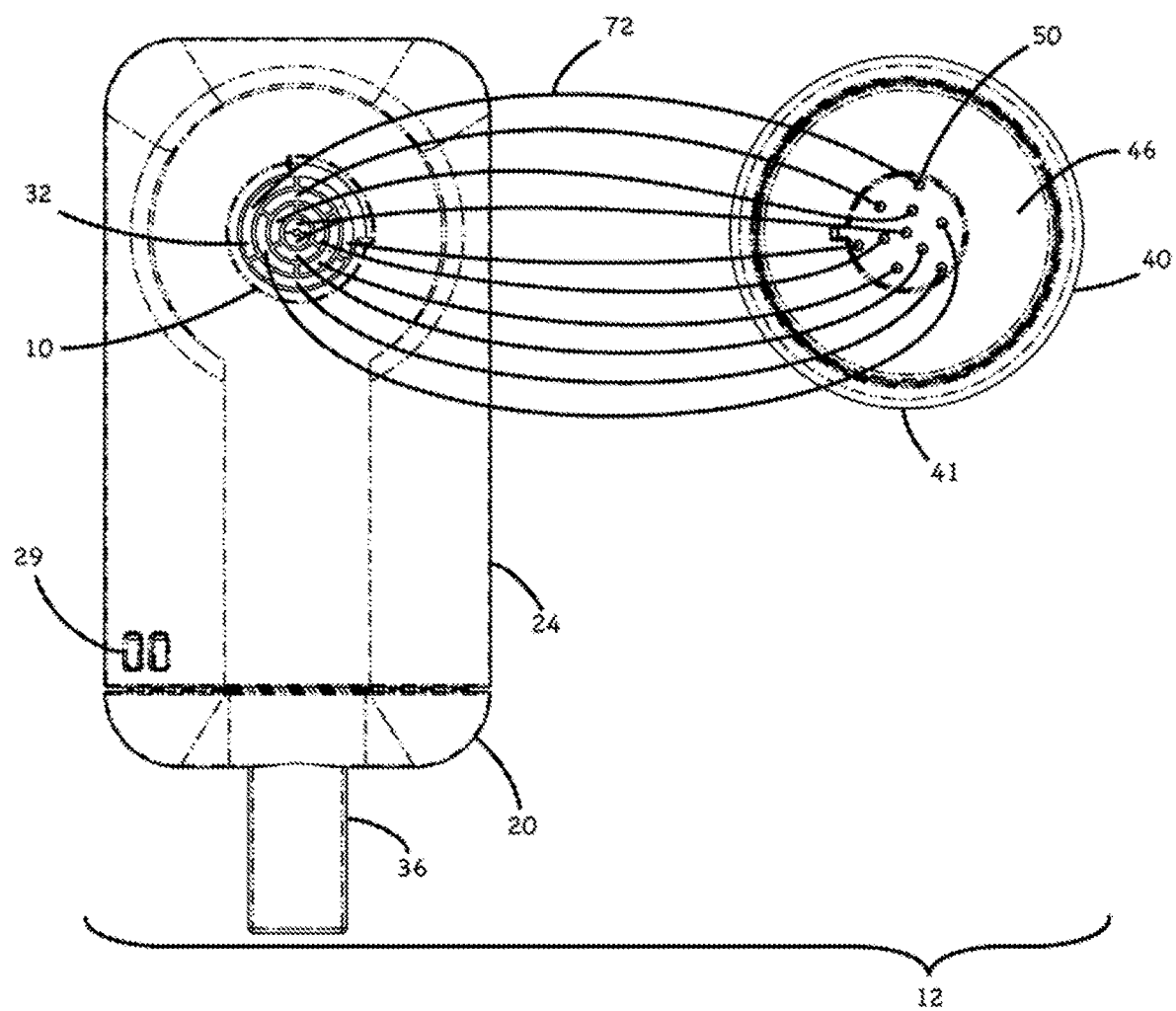
FIG. 2 is a top view of the connecting system highlighting the correlation between the connector port conductive traces on electronic device and the dock contacts.

FIG. 2 is an enlarged view of the connecting system 12 including the dock interface assembly 40 having contacts 50 for engaging a corresponding number of conductive traces 32 formed on a printed circuit board integrated into a case assembly 20 for use on a smart phone 14. Although ten (10) contacts 50 and eleven (11) conductive traces 32 are shown, any number of contacts 50 and conductive traces 32 may be provided. As indicated above, the contacts 50 and the conductive traces 32 may cooperate to facilitate transmission of power and/or data from an external cable 90 and into the electronic device 14. In this regard, power and/or data may be transmitted through a universal serial bus (USB) cable 90, through the contacts 50, into the conductive traces 32, and into the smart phone 14 via the connector 36, all while the electronic device 14 (e.g., smart phone 15) is magnetically coupled to the dock interface assembly 40. FIG. 2 further highlight possible electrical path 72 that the electrical signal may take going from each respective contact 50 to each corresponding trace 32. As highlighted, a plurality of traces may be design to come in contact with a single contact 50, as to for example combine multiple ground traces or any other purpose.

Figure 3:
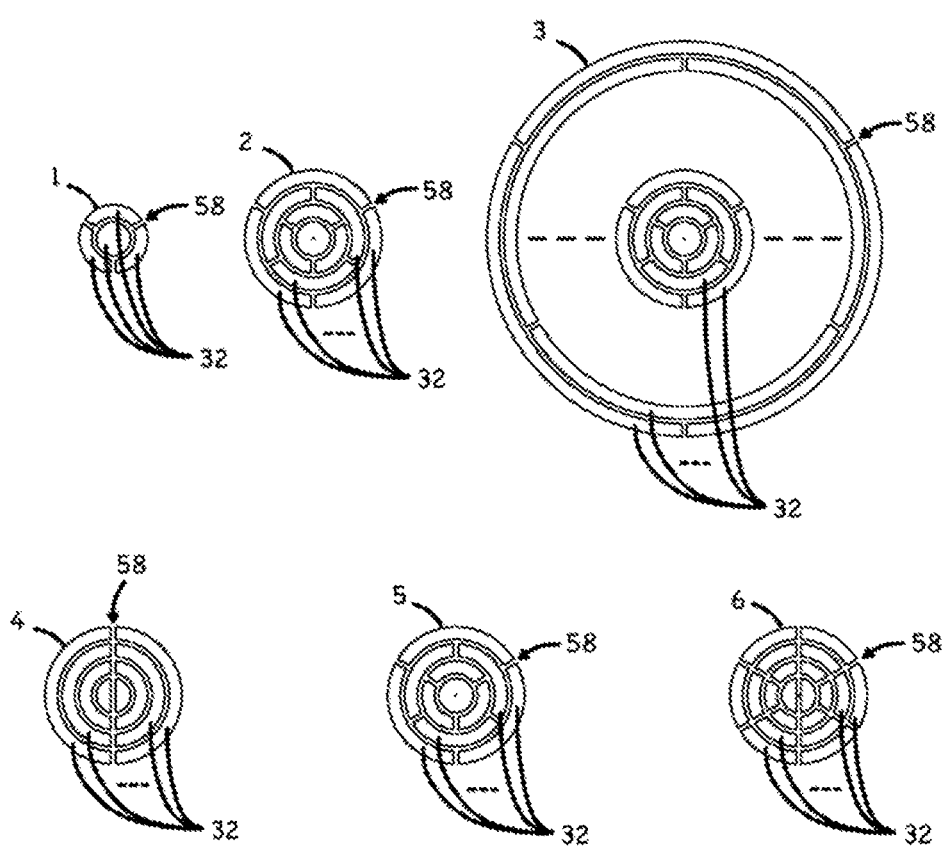
FIG. 3 is a top view of various embodiments of the electronic device connector port interface showing various numbers of traces and nonconductive trace separating spaces.

FIG. 3 illustrates a plurality of embodiment of the traces 32 and the nonconductive separating spaces 58. However, traces 32 and the nonconductive separating spaces 58 may be incorporated for use in any one of a variety of different environments and applications, and is not limited to the above-described embodiments. As indicated above, although the traces 32 may have a generally round or circular shape to complement the corresponding placement of the contacts 50, the traces 32 may be provided in any arrangement including a non-circular arrangement. As shown in FIG. 3, the nonconductive separating spaces 58 may divide the otherwise annular shaped traces 32 into a multitude of smaller traces, as for example to fit more electrical path 72 into a limited space. The nonconductive separating spaces 58 may comprise an air gap and/or may be a nonconductive separating material such as plastic and other insulators.

Referring to FIG. 3, connector 1 has a comparatively low number of traces. Connector 1 includes four traces: one in the center with the surface in the form of a circle, and three traces that form a ring around the circle and axis of rotation. There are three nonconductive separating spaces between the different traces that form the ring. Connector 2 and connector 3 show different arrangements having with a greater number of traces. Each of these connectors has a plurality of concentric rings around the center axis, with each ring being formed by a plurality of conductive traces and nonconductive separating spaces between each conductive trace. Connector 4, connector 5, and connector 6 depict different arrangements of traces and splits, where each arrangement has a different number of traces and nonconductive separating spaces. In connector 4, each ring has two conductive traces that are split by corresponding nonconductive separating spaces. In connector 5, each ring is split in three, and in connector 6, each ring is split in five. Thus the arrangement of the traces and nonconductive separating spaces may vary from implementation to implementation.

Figure 4:
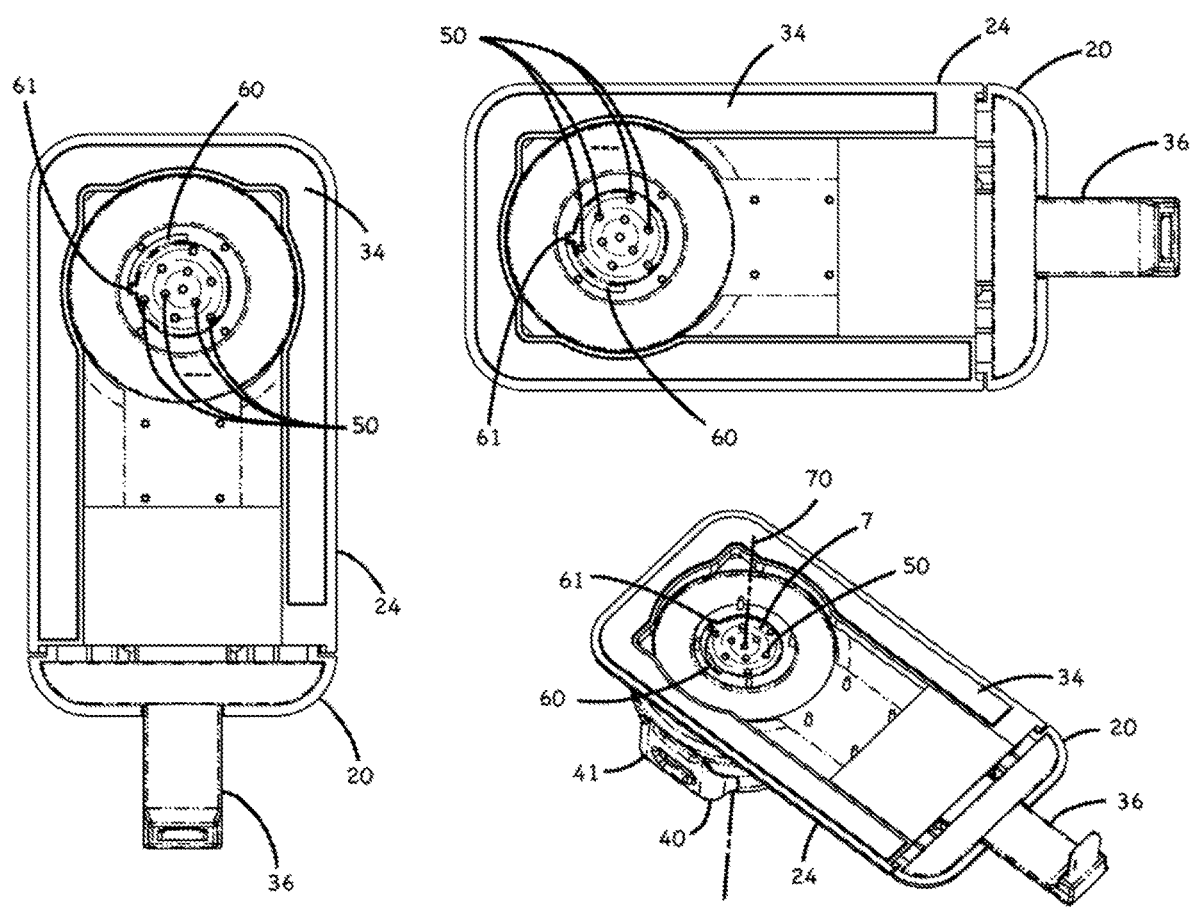
FIG. 4 is a top view of the connecting system rotated to its rotational limits, highlighting the rotation stop features.

FIG. 4 illustrates an embodiment of the connecting system 12 where the case assembly 20 is rotated on the dock interface assembly 40 from portrait orientation to landscape orientation about an axis of rotation 70. As the case assembly 20 is rotated the contacts 50 follow a contact path 7 on the traces 32 as illustrated. Although only one contact path is depicted (contact path 7), conceptually there may be three separate contact paths for contacts 50: one that follows the inner ring of the traces 32, one the follows the middle ring, and one that follows the outer ring, The dock interface assembly 40 may include a rotation stop 61 designed to travel within a rotation range 60 that may be built into the case assembly 20. The rotation stop 61 may prevent contacts 50 from traversing the nonconductive separating spaces 58 along the contact path and having contacting relation with another conductive trace other than the conductive trace with which the contact is aligned and to which the contact corresponds. Thus, each contact may maintain continuous contacting relation with a single conductive trace during rotation.

Figure 5:
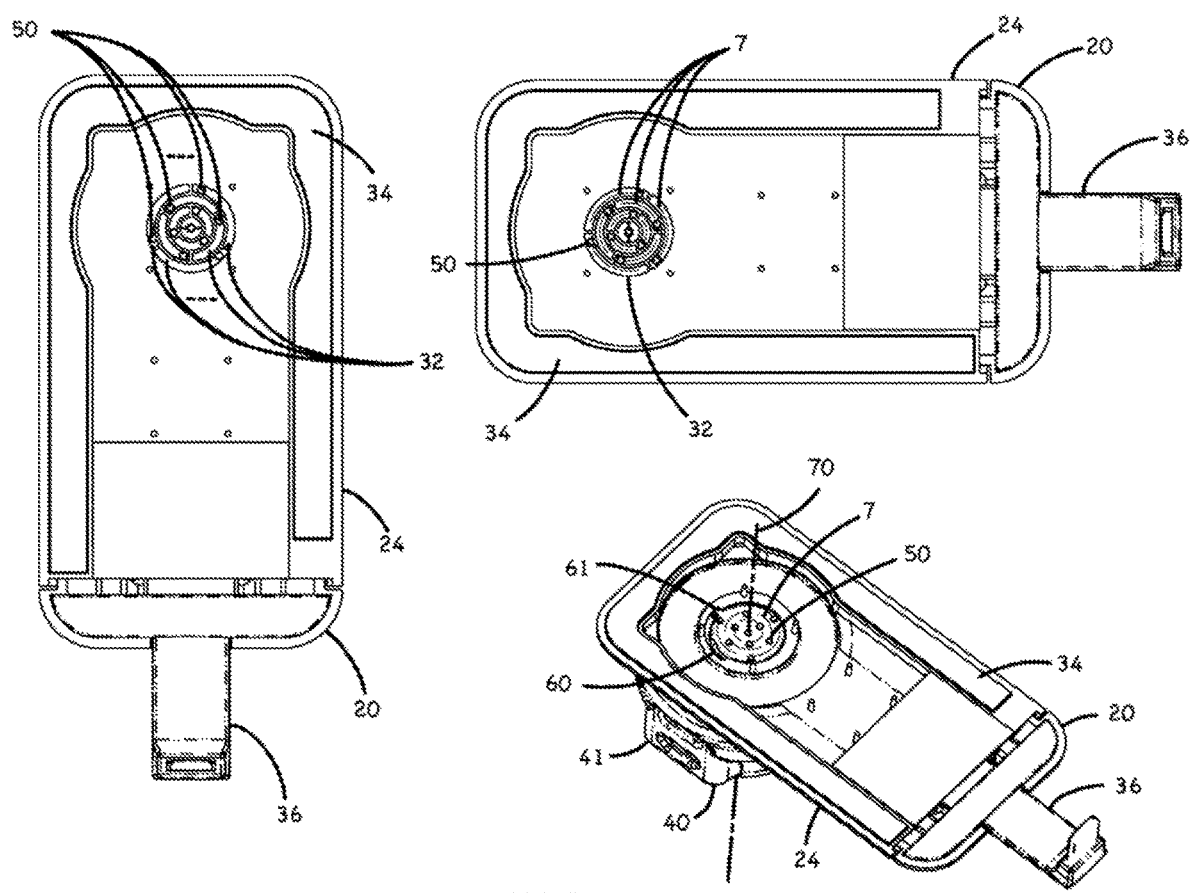
FIG. 5 is a top view of the connecting system rotated to its rotational limits, highlighting the movement of the contacts with respect to the traces.

In FIG. 5 the conductive traces 32 are shown as being divided by nonconductive separating spaces 58 that separate conductive traces 32 along the contact path 7 of the contacts 50 when the electronic device 14 is rotated about the dock interface assembly 40. The rotation stop 61 may be arranged such that the contacts 50 are prevented from having contacting relation with conductive traces 32 other than a conductive trace 32 to which the contact 50 corresponds and with which the contact is aligned. Traces 32 form a surface that substantially surrounds the axis of rotation 7, where the surface is split by nonconductive separating spaces between the at least two conductive traces. When traces 32 rotate around the center of axis, the corresponding contacts may change the contact position along the corresponding trace such that the contact is maintained in contacting relation at a first location when the electronic device is in a first rotational position (e.g., landscape mode) and at a second location when the electronic device is in a second rotational position (e.g., portrait mode).

Advantageously, the present arrangement of the dock interface assembly 40 and conductive traces 32 provides a means for providing continuous power and/or continuous data to the electronic device 14 when the electronic device 14 is rotated relative to the dock interface assembly 40. In this regard, the electronic device 14 is rotatable relative to the dock interface assembly 40 when the metallic element 26 is magnetically coupled to the magnets 48 of the dock interface assembly 40. For example, a user may rotate the electronic device 14 between a vertical orientation (e.g., portrait mode) such as for reading a document displayed on the electronic device 14, and a horizontal orientation (e.g., landscape mode) such as for watching a video displayed on the electronic device 14.

Figure 6:
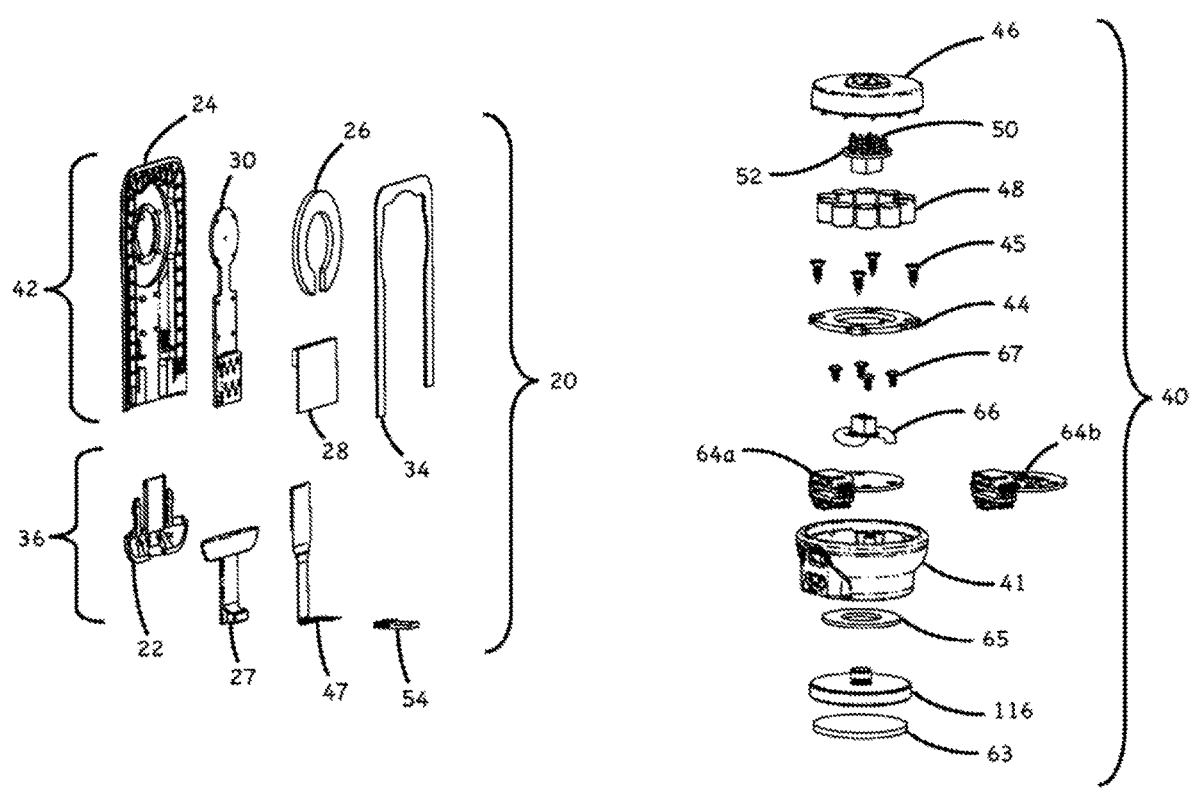
FIG. 6 is an exploded perspective illustration of the case assembly and an exploded perspective illustration of the dock assembly.

FIG. 6 is an exploded view of an embodiment of the dock interface assembly 40 and the case assembly 20. As indicated above, the magnet holder 46 may include a plurality of magnets 48 that create the magnetic attraction to the metallic element 26 of the case assembly 20. When the dock interface assembly 40 is fastened to base 116 for used in an automobile or for home use, the magnetic attraction allows for convenient one-handed operation to mount the electronic device 14 to the dock interface assembly 40. In this regard, the connecting system 12 disclosed herein provides a significant advantage over the prior art by providing the ability to mount the electronic device 14 by simply positioning the case assembly 20 onto the dock interface assembly 40 causing the spring-loaded contacts 50 to make a data connection and/or a power connection between the electronic device 14 and the dock interface assembly 40.

In FIG. 6 as indicated above, the dock interface assembly 40 may include a magnet holder 46 configured to house or retain a plurality of the magnets 48. The magnets 48 may be pressed into one or more magnet pockets that may be formed on a back side of the magnet holder 46. In an embodiment, the magnets 48 may be mechanically retained or adhesively bonded to the magnet holder 46. In a further embodiment, the magnet holder 46 may be configured such that the magnets 48 are slidably removable from the magnet holder 46 to allow for reconfiguring the quantity, position, and orientation of the magnets 48. However, other means can be used to provide the coupling between the case assembly 20 and the dock interface assembly 40, and is not limited to magnetic coupling via the magnet holder 46 embodiment disclosed herein, but could instead be accomplished via mechanical means as described in FIG. 9A below.

In the embodiment of FIG. 6, the dock interface assembly 40 includes the dock housing 41 which may be integrally formed with a threaded connection as to allow base 116 to be easily attached or alternatively used to fasten the dock interface assembly 40 to other external mount design, such as a tripod. The bottom of the dock housing 41 may be equipped with a rubber pad 65 to help prevent loosening under vibration. The contacts 50 may be coupled to a printed circuit board 52 of the dock interface assembly 40. In an embodiment, the contacts 50 may protrude from a printed circuit board 52 of the dock interface assembly 40. The printed circuit board 52 may be coupled to a cable 66 to carries electric signals to a dock connector PCB 64 fitted with industry standard connectors and/or proprietary socket connector as to allow connection to and external cable such as a USB cable 90. The dock connector PCB 64 may be held inside the dock housing 41 by screws 67. As described in more detail in FIG. 9 the various embodiments for the dock connector PCB 64 may be used such as a first dock connector PCB 64a this simple pass through PCB design with little or no electronic components. Alternatively a second connector PCB 64b design may be use to allow electronic switching of electrical signals, which may be advantageous to allow multiple electronic device 14 to share a limited number of contacts 50.

As illustrated in FIG. 6 the spring-loaded contacts 50 may protrude through the magnet holder 46. The magnet holder 46 may advantageously be installed in a manner allowing for direct contact between the magnets 48 and the clamping ring 44 connected to the dock housing 41 via screws 45. This direct contact results in greater strength of magnetic attraction between the clamping ring 44 and the magnets 48 than strength of the magnetic attraction between the magnets 48 and the metallic element 26 of the case assembly 20. In this manner, the magnet holder 46 may remain attached to the clamping ring 44 without the use of mechanical fasteners. The lack of mechanical fasteners provides a convenient means for replacing or reconfiguring the magnetic holder 46 with a different configuration of magnets 48 such as to provide more or less magnetic attraction to the metallic element 26.

In addition FIG. 6 illustrate an exploded view of case assembly 20. In an embodiment a traces enclosure assembly 42 may feature a single case housing 24 that is fastened to the electronic device 14 by a double sided adhesive tape 34. To keep the overall high minimal the metallic element 26 and the case printed circuit board may be held in place by an epoxy glue (not shown) retained in the case housing 24 by a label 28 constructed with a foam layer as to comply with case housing 24 internal surface. For a more durable assembly the connector assembly 36 may be produced by molding a flexible rubber material 27 over a flexible printed circuit board 47 and having the same flexible rubber material 27 permanently encapsulate a connector plug 54. The connector plug 54 may be made of metal as to allow insertion into the electronic device connector port 16.

Figure 7:
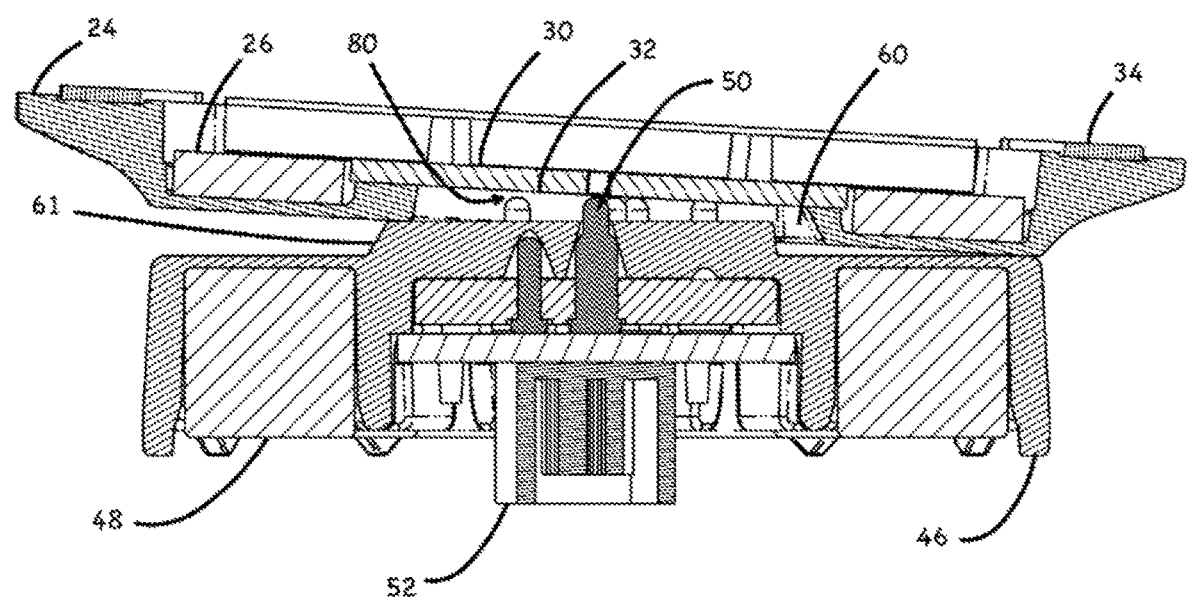
FIG. 7 is a cross-sectional illustration of a case assembly being magnetically coupled to the dock interface assembly rotated past the rotational stop to highlight its position while outside the rotational limits.

FIG. 7 is a cross section of the connecting system 12 through the axis of rotation 70 with the case assembly 20 purposely shown rotated to have its rotation range 60 moved past the rotation stop 61 of the dock interface assembly 40. In the described embodiment the rotation stop may be shaped as to create a gap 80 between one or more contact 50 and trace 32. The described gap 80 may be used with intentional placement of the power or data line as to create an open circuit and avoid incorrect connection to take place.

Figure 8:
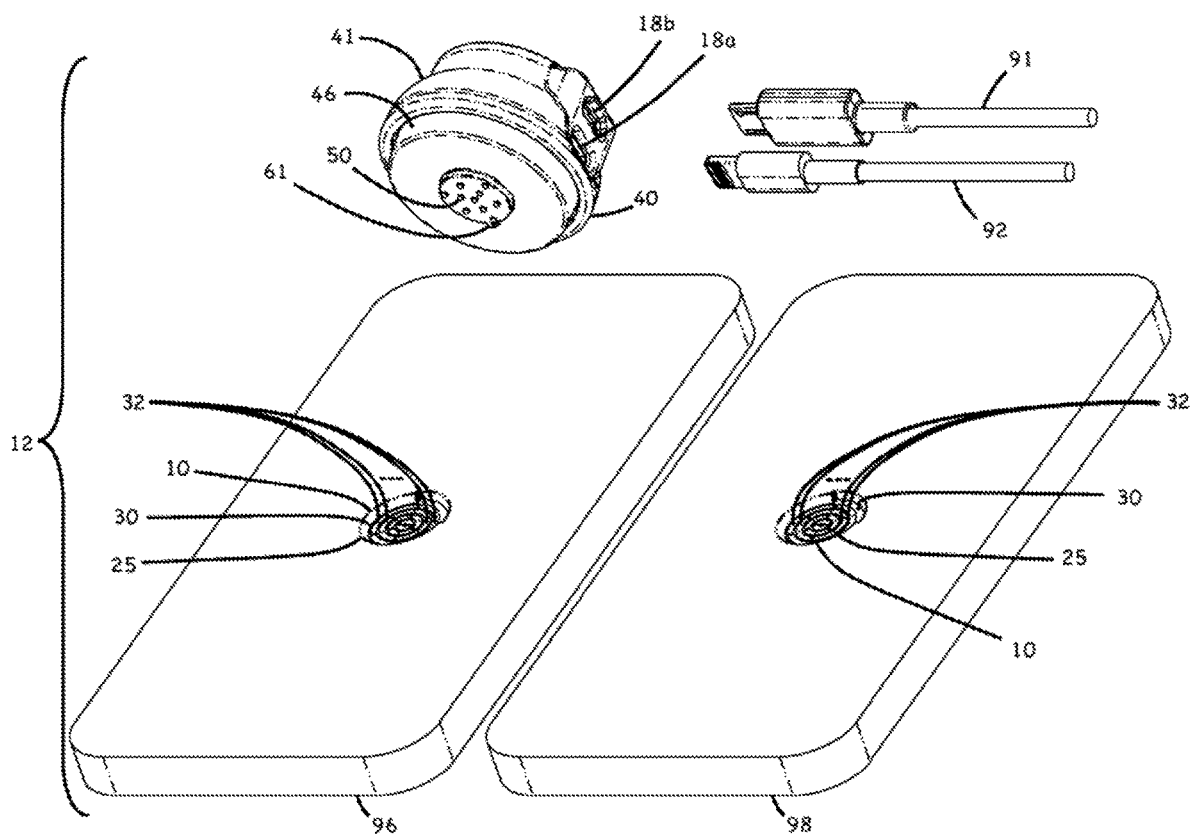
FIG. 8 is an exploded perspective view of a connecting system for two electronic devices such as a Lightning compatible device and a Micro-USB compatible device with a dock interface assembly for magnetically coupling with the electronic devices, as well as two cable used to transmit data and power.

FIG. 8 is an exploded perspective view of a connecting system 12 for two electronic devices 14 such as a Lightning compatible device 96 and a Micro-USB compatible device 98. In this embodiment a dock interface assembly 40 may be used for magnetically coupling with the electronic devices 14, as well as a Lightning cable 92 which may plug into a first dock connector port 18a, as well as a Micro-USB cable 91 which may plug into a second dock connecting port 18b. The external cables 90 described may be used to transmit data and/or power when plugged into the dock connector ports 18. In one embodiment the dock interface assembly 40 could be assembled with the first dock connector PCB 64a made with an electrical routing allowing all the different electrical signal lines from the Lightning compatible device and Micro-USB compatible device to use separate contacts 50 and conductive traces 32. This configuration may use more contacts 50 but will yield a first dock connector PCB 64a with little or no electrical components such as resistors, capacitor or integrated circuitry (IC). In a different embodiment the second dock connector PCB 64b may be used in the dock interface assembly 40 to reduce the number of contacts 50 and conductive traces 32 when two electronic devices 14 of different wiring standards are to share the same dock interface assembly 40. In this embodiment the second dock connector PCB may be populated with electronic components, such as resistor, capacitors, integrated circuitry (IC), multiplexer/demultiplexer (mux/demux), of other type of appropriate components to electronically switch the signals lines so one or more can share the same contact 50 across electrical devices 14. In yet another embodiment the dock interface assembly 40 may use a physical switch (not shown) such as a toggle switch to reduce the numbers or contacts 50 while still being able to use the dock interface assembly 40 across different electronic devices 14. In another embodiment the reduction is contacts 50 may be achieved by sharing certain electrical lines of the Lightning cable 92, such as the USB data+ (D+), the USB data- (D-) and ground, with the use of a separate plug (not shown) located between the Lightning cable 92 USB-A plug and the charger or computer. The separate plug (not shown) may bring power to the dock interface assembly 40 via a separate external line plugged into the second dock connector port 18b.

Figure 9A:
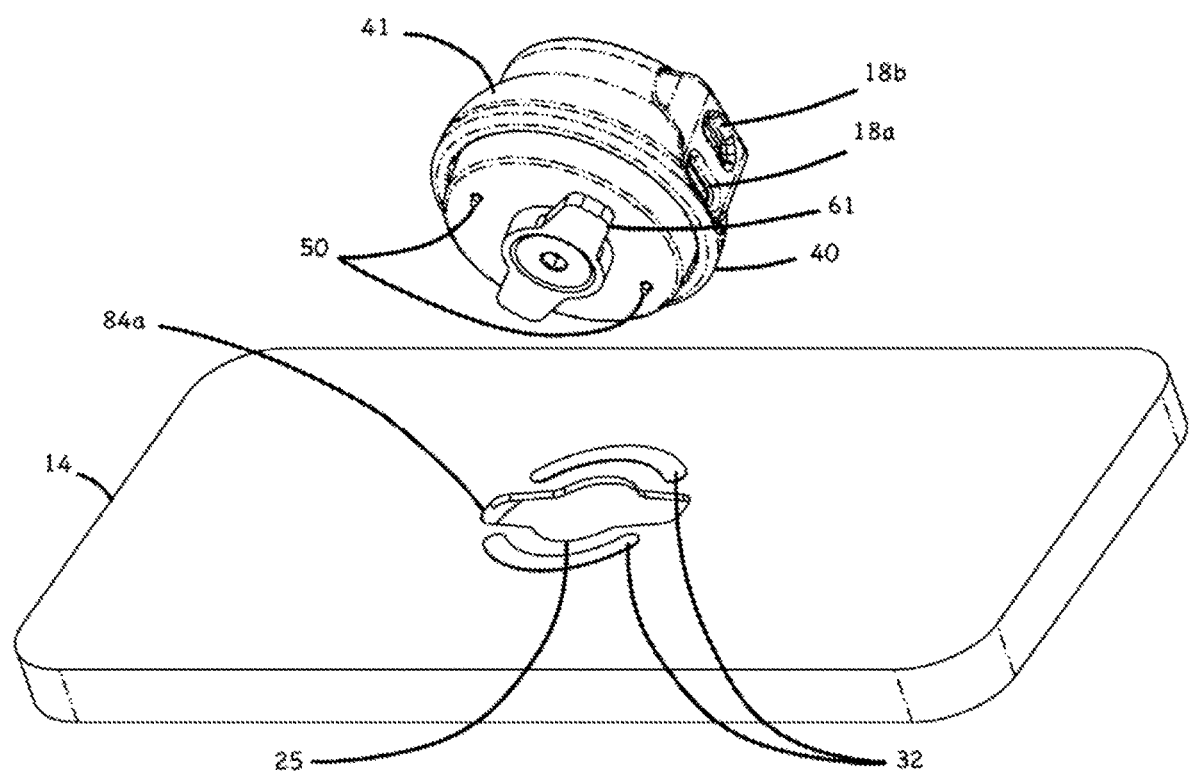
FIG. 9A is an exploded perspective view of an alternate embodiment of the invention where an electronic device and a dock are mechanically coupled.

FIG. 9A is an exploded perspective view of an alternate embodiment of the connecting system 12 where the electronic device 14 and the dock interface assembly 40 may be held together by a mechanical coupling system 84a. In this embodiment the rotation stop 61 may be built into the mechanical locking mechanism. The conductive traces 32 and contacts 50 may be placed away from the axis of rotation 70 as to allow for simpler mechanical designs, such as collars with simple round shaft help in place by a single fastener.

Figure 9B:
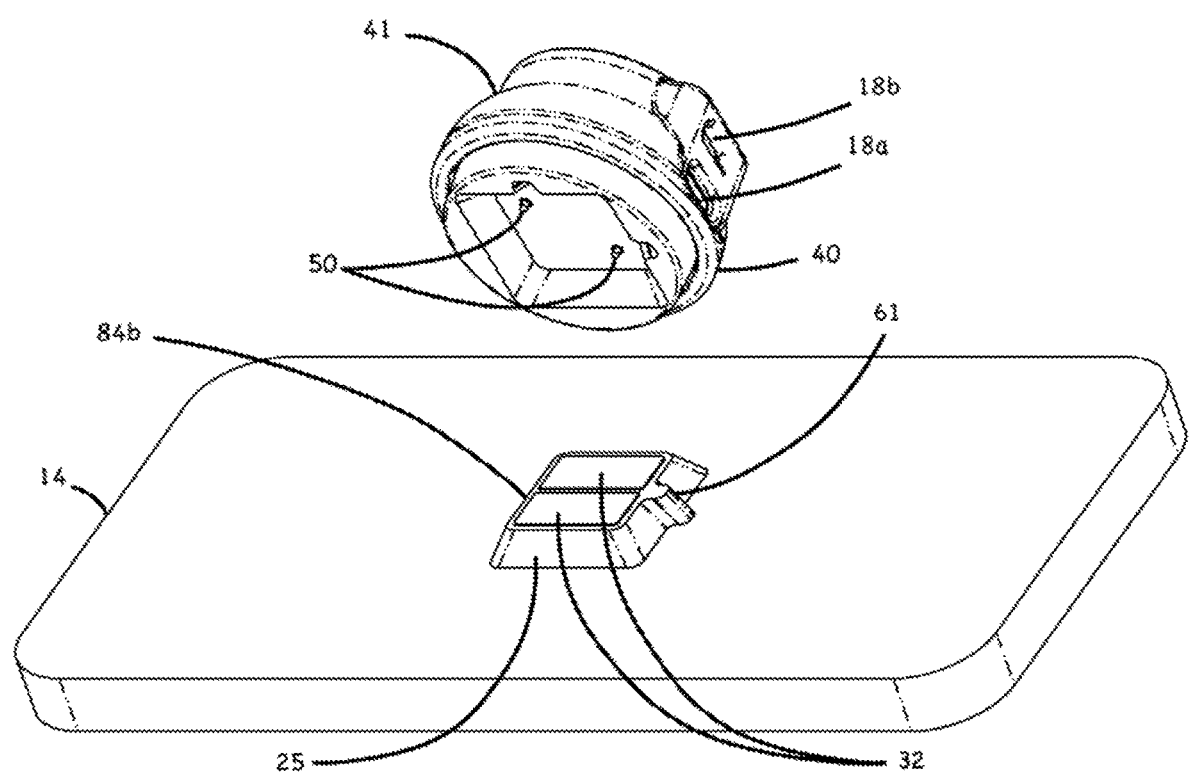
FIG. 9B is an exploded perspective view of an alternate embodiment of the invention where an electronic device and a dock are magnetically coupled via a non-round interface.

FIG. 9B is an exploded perspective view of an alternate embodiment of the connecting system 12 where the electronic device 14 and the dock interface assembly 40 may be held together by a square shaped coupling system 84b. The contacts 50 may be designed to have enough telescopic travel range as to maintain contact with the electronic device 14 during rotation. The traces 32 may be shaped as to complement the shape of the alignment feature or any other cosmetic need.

Figure 10:
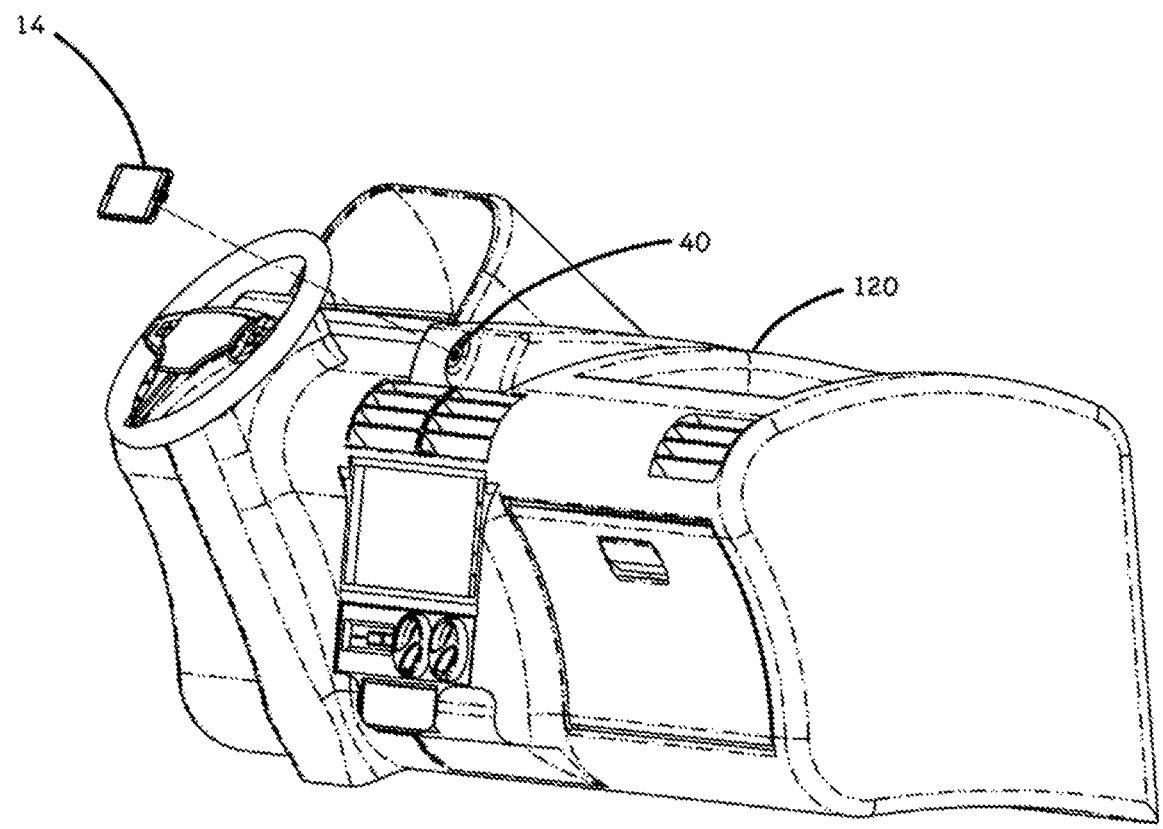
FIG. 10 is an exploded illustration of an electronic device in the context of being used on a dock interface assembly built into the dashboard of an automobile.

FIG. 10 is an exploded illustration of the electronic device 14 in the context of being used on a dock interface assembly 40 built into the dashboard 120 of an automobile.

Figure 11:
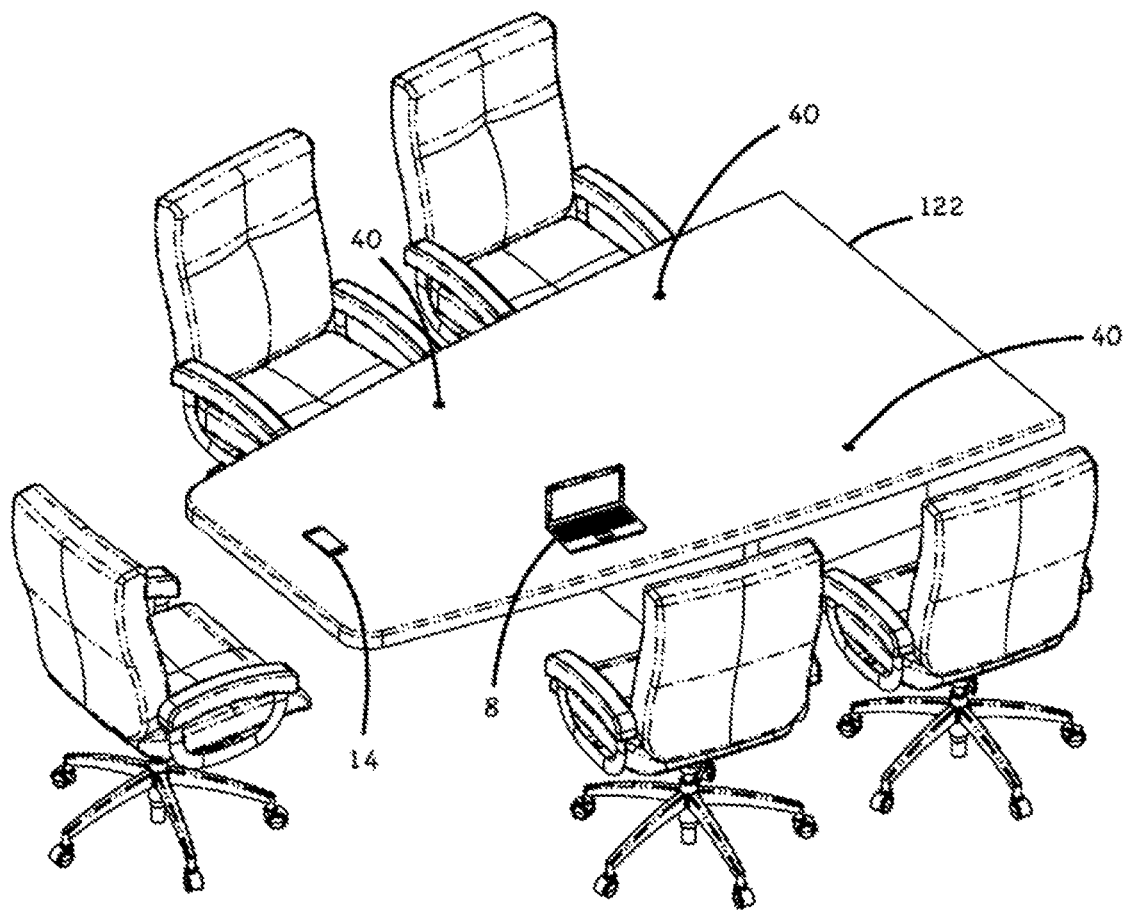
FIG. 11 is an exploded illustration of an electronic device, such as a smart phone, and a large electronic device, such as a laptop computer, in the context of being used on dock interface assemblies built into the surface of a conference room table.

FIG. 11 is an exploded illustration of the electronic device 14 such as a smart phone 15 and a large electronic device 8 such as a laptop computer, in the context of being used on dock interface assemblies 40 built into the surface of a conference room table 122.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The following is claimed:

1. A connecting system for an electronic device, comprising:
   a connector port including two or more conductive traces and a rotation range radially extending 90-degrees away from the two or more conductive traces; and
   a dock interface detachably coupled to the connector port, the dock interface including two or more contacts configured to electrically couple to the two or more conductive traces, and a rotation stop extending away from the two or more contacts, the rotation stop configured to detachably couple to the rotation range whereby the rotation range and the rotation stop are configured to limit rotational movement of the electronic device between a first rotational position and a second rotational position,
   the connector port being rotatable relative to the dock interface such that at least two contacts of the two or more contacts are maintained in contacting relation with at least two conductive traces of the two or more conductive traces along a contact path when the electronic device is rotated relative to the dock interface.

2. The connecting system of claim 1, wherein the two or more conductive traces define a first concentric ring comprising a first conductive trace and a second conductive trace, the first concentric ring having a first nonconductive separating space and a second nonconductive separating space each located between the first conductive trace and the second conductive trace.

3. The connecting system of claim 2, wherein the two or more conductive traces define a second concentric ring comprising a third conductive trace and a fourth conductive trace, the second concentric ring having a third nonconductive separating space and a fourth nonconductive separating space each located between the third conductive trace and the fourth conductive trace, wherein the second concentric ring is located inside the first concentric ring, wherein the two or more conductive traces define a third concentric ring comprising a fifth conductive trace and a sixth conductive trace, the third concentric ring having a fifth nonconductive separating space and a sixth nonconductive separating space each located between the fifth conductive trace and the sixth conductive trace, wherein the third concentric ring is located inside the second concentric ring, and wherein the first nonconductive separating space, the second nonconductive separating space, the third nonconductive separating space, the fourth nonconductive separating space, the fifth nonconductive separating space, and the sixth nonconductive separating space are all aligned with respect to each other.

4. The connecting system of claim 1, wherein the two or more conductive traces define a first concentric ring comprising a first conductive trace, a second conductive trace, and a third conductive trace, the first concentric ring having a first nonconductive separating space located between the first conductive trace and the second conductive trace; a second nonconductive separating space located between the second conductive trace and the third conductive trace; and a third nonconductive separating space located between the first conductive trace and the third conductive trace.

5. The connecting system of claim 4, wherein the two or more conductive traces define a second concentric ring comprising a fourth conductive trace, a fifth conductive trace, and a sixth conductive trace, the second concentric ring having a fourth nonconductive separating space located between the fourth conductive trace and the fifth conductive trace; a fifth nonconductive separating space located between the fifth conductive trace and the sixth conductive trace; and a sixth nonconductive separating space located between the fourth conductive trace and the sixth conductive trace, wherein the second concentric ring is located inside the first concentric ring, and wherein the first nonconductive separating space, the second nonconductive separating space, the third nonconductive separating space, the fourth nonconductive separating space, the fifth nonconductive separating space, and the sixth nonconductive separating space are all misaligned with respect to each other.

6. The connecting system of claim 5, wherein the two or more conductive traces define a third concentric ring comprising a seventh conductive trace, an eighth conductive trace, and a ninth conductive trace, the third concentric ring having a seventh nonconductive separating space located between the seventh conductive trace and the eighth conductive trace; an eighth nonconductive separating space located between the eighth conductive trace and the ninth conductive trace; and a ninth nonconductive separating space located between the seventh conductive trace and the ninth conductive trace, wherein the third concentric ring is located inside the second concentric ring.

7. The connecting system of claim 6, wherein the first nonconductive separating space and the seventh nonconductive separating space are aligned with each other, wherein the second nonconductive separating space and the eighth nonconductive separating space are aligned with each other, and wherein the third nonconductive separating space and the ninth nonconductive separating space are aligned with each other.

8. The connecting system of claim 6, wherein a first gap between the first concentric ring and the second concentric ring is less than a second gap between the second concentric ring and the third concentric ring.

9. The connecting system of claim 1, further comprising the electronic device, wherein when the electronic device is in the first rotational position the electronic device is aligned in a portrait position, and when the electronic device is in the second rotational position the electronic device is aligned in a landscape position.

10. The connecting system of claim 1, wherein the rotation stop is configured such that each contact of the two or more contacts remain electrically coupled to a same respective conductive trace of the two or more conductive traces between the first rotational position to the second rotational position.

11. The connecting system of claim 1, wherein the rotation range is configured such that each conductive trace of the two or more conductive traces remain electrically coupled to a same respective contact of the two or more contacts between the first rotational position and the second rotational position.

12. The connecting system of claim 1, wherein the dock interface is magnetically coupled to the connector port.

13. The connecting system of claim 1, wherein the connector port comprises a magnet that surrounds the two or more conductive traces and the rotation range.

14. The connecting system of claim 1, wherein the dock interface comprises a magnet that surrounds the two or more contacts and the rotation stop.

15. The connecting system of claim 1, wherein the connector port comprises at least one nonconductive space separating the two or more conductive traces.

16. The connecting system of claim 1, wherein the dock interface comprises at least one nonconductive space separating the two or more contacts.

17. The connecting system of claim 9, wherein the electronic device comprises a smart phone.

18. The connecting system of claim 1, wherein the dock interface comprises a first dock connector port configured to receive a first external cable configured to transmit at least one of data and power through the dock interface and the connector port.

19. The connecting system of claim 18, wherein the dock interface comprises a second dock connector port configured to receive a second external cable configured to transmit at least one of data and power through the dock interface and the connector port.

20. The connecting system of claim 19, wherein the first dock connector port and the second dock connector port are configured to receive different types of external cables.

\* \* \* \* \*